United States Patent [19]

Ace

[11] Patent Number: 4,859,261
[45] Date of Patent: Aug. 22, 1989

[54] METHOD OF MAKING MULTI-FOCUS OPHTHALMIC LENS

[76] Inventor: Ronald S. Ace, 6150 Springhill Ter., Greenbelt, Md. 20770

[21] Appl. No.: 192,660

[22] Filed: May 11, 1988

[51] Int. Cl.$^4$ .............................................. B32B 17/00
[52] U.S. Cl. ....................................... 156/102; 65/39; 156/106; 156/307.1; 264/1.8; 264/2.7; 351/172
[58] Field of Search ............... 65/37, 39, 61; 264/1.8, 264/2.7; 156/307.1, 102, 106; 351/159, 166, 172

[56] References Cited

U.S. PATENT DOCUMENTS

| | | |
|---|---|---|
| Re. 15,897 | 4/1923 | Clement . |
| 392,053 | 10/1888 | Morck, Jr. . |
| 795,425 | 7/1905 | Bowers . |
| 890,813 | 6/1908 | Stead ........................................ 65/39 |
| 901,576 | 10/1908 | Wilhelm ................................... 65/39 |
| 993,812 | 5/1911 | Aitchison . |
| 1,153,859 | 9/1915 | Bugbee . |
| 1,180,395 | 4/1916 | Hill . |
| 1,498,370 | 6/1924 | Fisher . |
| 1,520,617 | 4/1922 | Tillyer et al. . |
| 1,525,244 | 11/1922 | Laabs . |
| 1,538,813 | 9/1922 | Laabs et al. . |
| 1,734,428 | 12/1926 | Haering . |
| 2,049,094 | 7/1936 | Tillyer . |
| 2,072,593 | 3/1937 | Hill ............................................ 65/37 |
| 2,092,789 | 9/1937 | Tillyer . |
| 2,129,243 | 6/1938 | Stotsky . |
| 2,596,863 | 5/1952 | Moulton et al. ..................... 260/27 |
| 2,678,586 | 5/1954 | Lugert ....................................... 88/57 |
| 3,297,422 | 1/1967 | Emerson et al. ................... 65/37 X |
| 3,628,854 | 0/1971 | Jampolsky ......................... 351/175 |
| 3,771,858 | 11/1973 | Bivens ................................. 351/159 |
| 4,247,179 | 1/1981 | Daniels et al. . |
| 4,495,015 | 1/1985 | Petcen ................................. 156/80 |
| 4,543,146 | 9/1985 | Petcen ................................. 156/242 |
| 4,547,049 | 10/1985 | Cotie ................................... 351/159 |
| 4,576,623 | 3/1986 | Mann ................................. 65/37 X |
| 4,577,942 | 5/1986 | Frieder et al. ..................... 351/159 |
| 4,645,317 | 2/1987 | Frieder et al. ..................... 351/164 |
| 4,679,918 | 7/1987 | Ace ..................................... 351/163 |
| 4,781,452 | 11/1988 | Ace ..................................... 351/177 |

OTHER PUBLICATIONS

"Evaluating What's New" Journal of American Optometric Assoc., Jul. 1972, p. 795 by George P. Elmstrom, O.D.
"3M Brochure: Press-On Optics from 3M" Application Instructions.
Jones Optical Company Brochure: Carbonite 360 and 1000 Polarized Feather Light-Pure Sight.

Primary Examiner—Robert L. Lindsay
Attorney, Agent, or Firm—Jones & Tullar & Cooper

[57] ABSTRACT

A method of producing multifocal ophthalmic lenses having a near vision minor lens element adhesively secured to the ocular surface of a major lens is disclosed. The ocular surface of the major lens is finished to provide an ophthalmic prescription lens. This ocular surface may have a spherical, cylindrical, or prismatic curvature, or any combination thereof, and thus generally may have a complex toric curvature. The minor lens has a predetermined "add power", to provide a near vision segment on the major lens, and preferably is flexible, or is made flexible as by heating, so that it can conform to the shape of the toric curve on the ocular surface of the major lens without distortion or change in its add power. An adhesive material is placed on the major lens, and the minor lens is carefully positioned and gently pressed against it so that it conforms to the curvature of the major lens.

18 Claims, 1 Drawing Sheet

U.S. Patent     Aug. 22, 1989     4,859,261
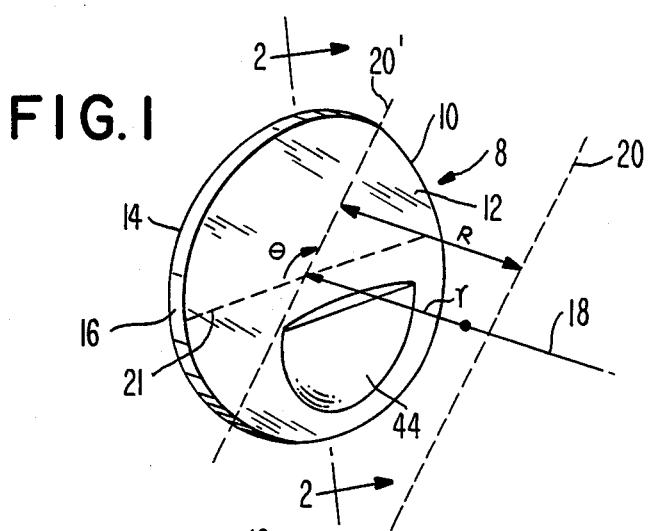
FIG. 1
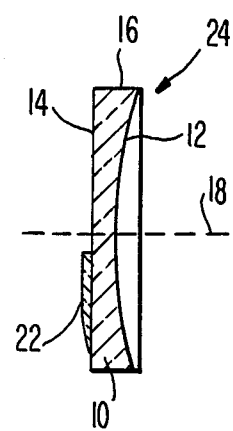
FIG. 3
PRIOR ART
FIG. 2
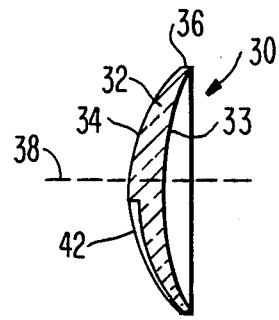
FIG. 4
PRIOR ART
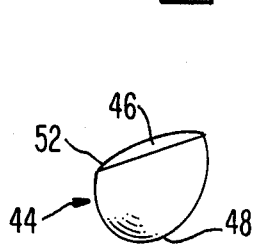
FIG. 5A
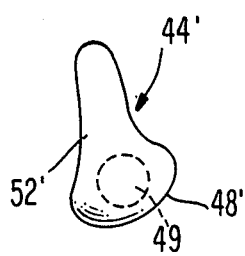
FIG. 5B
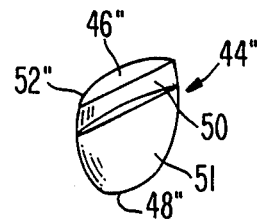
FIG. 5C
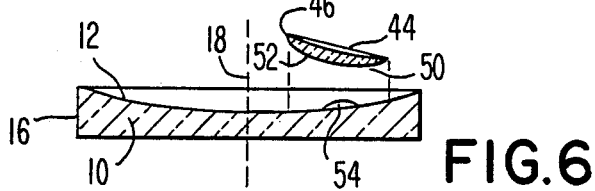
FIG. 6
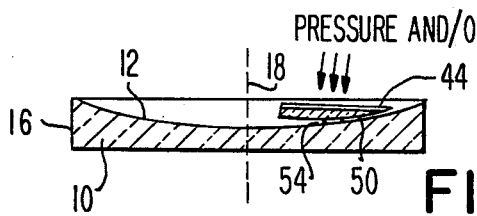
PRESSURE AND/OR HEAT
FIG. 7
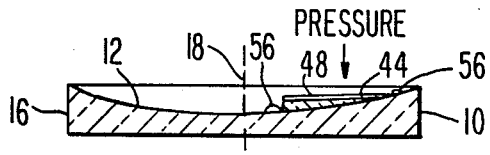
PRESSURE
FIG. 8
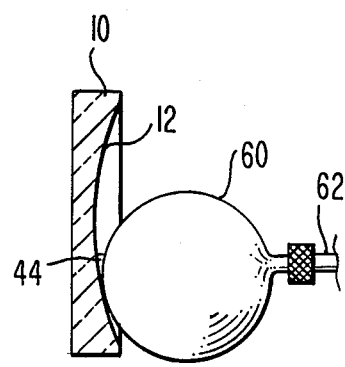
FIG. 9

METHOD OF MAKING MULTI-FOCUS OPHTHALMIC LENS

BACKGROUND OF THE INVENTION

The present invention relates, in general, to a multi-focus ophthalmic lens, and more particularly to a simple, economical method of making such a lens.

The manufacture of prescription eyeglass lenses is a complex art, since it involves huge numbers of possible optical prescriptions. The simplest lens is a spherical surface with a single focal length, but most lenses are more complicated, the typical ophthalmic lens requiring compound curves wherein spherical surfaces are ground simultaneously with sphero-cylindrical surfaces to produce what is known as a torically curved surface. Such surfaces may be further compounded with prismatic power, and may also include multifocal elements, such as bifocal or trifocal segments. The combinations required to meet the needs the large number of people who wear prescription eyeglasses are almost endless.

Lenses having complex compound curves can be produced through a multitude of techniques, using a wide variety of optical materials. For example, one current practice is to inventory a relatively large array of semi-finished lens blanks that already have their front spherical surfaces mass-produced to a prefinished form so that the final prescription can be completed by grinding the necessary compound curves on the rear, or ocular, surface of the lens, which is the surface nearest the eye. Almost every ophthalmic lens produced by a prescription laboratory involves the grinding of a compound toric and prismatic surface on the ocular surface, starting with a partially finished lens blank having a front surface which has been completed through the use of mass production technology. The front surface almost always has a planar or a simple spherical surface, and may also include a multifocal minor lens component affixed onto or formed in the front surface by the producer of the semifinished lens blank.

Numerous other manufacturing techniques are capable of producing the same optical results as are obtained in the manner described above. For example, one method used in the past was that of mass-producing semi-finished lens blanks with concave spherical surfaces formed on the ocular side and optionally including multifocal or minor lens segments, or elements, on that ocular surface. The front surfaces of these lens would then be ground and polished to provide the required prismatic, toric surfacing required for meeting the required prescription of a patient. With some care in calculating the amount and location of the grinding and polishing, the end product was still a lens with the same net compound powers as that of the above-discussed modern practice of rear toric surfacing. However, there is a major complication involved in front surface toric grinding and polishing, for such compound convex surfaces are very difficult to achieve with the degree of accuracy required for optical use. This is due primarily to the fact that it is extremely difficult to provide the wide range of motion required in a grinding and polishing machine to produce accurate convex curvatures. The grinding of a concave toric curve requires much less violent motion of the grinding machine, not only creating less wear and tear on the machinery, but also permitting a wider range of curves to be produced and resulting in more accurate surfaces.

Because of the foregoing problem, the laboratories which produce the large majority of ophthalmic lenses clearly prefer ocular side grinding and polishing over front surface polishing for toric curves. However, when ocular toric surfacing is elected for its inherent simplicity, that forces the location of multifocal minor lens components to front surface of the lens, principally because any grinding of the ocular surface after placement of the multifocal segment changes the thickness, and thus the power, of the segment. The grinding and polishing to prescription could not be done before placement of the minor lens element on the ocular surface because that would require matching the shape of the front surface of the minor lens to all of the possible complex curvatures of the ocular surface, while still retaining the correct net power for the lens. An inventory of hundreds of thousands of individual bifocal buttons would be needed for such matching, which would be totally impractical. Thus, the grinding of toric ocular surfaces, in accordance with current practice in the art, forces the multifocal elements to be located on the front surface of the lens.

The placement of a multifocal minor lens element on the front surface of the lens produces its own problems, however, for such a placement presumes prior knowledge of the thickness of the completed lens after the prescription has been ground into the rear surface. Such prior knowledge of the thickness of the lens behind, and supporting, the multifocal minor lens segment is extremely important, because the overall finished lens thickness determines the true and effective power of the minor lens segment. But in reality the multifocal element must be placed on the surface before it is known what prescription will be ground on the lens blank. Accordingly, the mass producers of semi-finished lens blanks containing front surface multifocal minor lens elements, or segments, can, at best, only make an educated estimate of the actual finished lens thickness, based on the average, or likely, prescription applications of the multifocal blank. They cannot accurately predict the final prescription lens thickness because this thickness depends on not only the prescription required by the specific patient, but also on the effective diameter of the eyeglass frame which is selected by the patient. For example, a specific prescribed lens power might result in a very thin finished lens if that lens were to be placed in a very small diameter eyeglass frame, whereas the same lens power could easily become many times thicker if the lens were designed for insertion into a very large diameter eyeglass frame. Since the power of the multifocal segment is largely dependent on the lens thickness in the region of the segment, the "add" power of the minor lens portion can be significantly affected by the thickness of the major lens behind the minor lens portion and this can result in very large departures from the desired lens power. Multifocal power discrepancies of over 50% can, and often are, found in lenses produced by prescription laboratories because of this effect. This may result in the lens falling outside of acceptable optical tolerances, resulting in rejection of the lens and a consequent financial loss. However, in many cases the discrepancy is dismissed because the lens manufacturer have been unable to alter the basic problem.

The ordinary procedure used by a prescription laboratory in the manufacture of multifocal lenses involves the selection of a semi-finished lens blank carrying a minor lens portion which is marked by the mass producer as having a certain "add" power. The distance prescription parameters required for the lens are then calculated without regard for the add power of the minor lens, and the required prescription is then ground on the ocular surfaces of the lens. However, the grinding away of the lens material behind the minor lens portions varies the power of the minor lens so that upon completion of the prescription grinding, the power of the minor lens portion may be significantly different from the "add" power originally selected. Although it is mathematically possible to recalculate the "add" power once the lens principal thickness has been calculated, this is not ordinarily done due to the sheer complexity of such correction factors. Of course, an optician discovering the "add" power error after producing it, could easily remake another lens using a new lens having a corrected "add" segment, but this would result in a very unacceptable cost and a waste of productivity.

From the foregoing it is seen that when multifocal minor lens segments are placed on the front surface of a main ophthalmic lens, the accuracy of the "add" power provided by the minor lens suffers, but by this placement of the minor lens, ocular side surfacing becomes available, and this is highly desirable. On the other hand, when a multifocal minor lens segment is placed on the ocular side of an ophthalmic lens, the "add" power provided by the minor lens segment remains accurate; however, toric surfacing must then be done on the front surface of the lens and this is more difficult. If the multifocal minor lens segments could be placed on the ocular side of the main lens while still allowing ocular side toric surfacing, "add" power errors would be avoided and toric surfacing would remain simple. But this would be the case only if the multifocal segment was not placed on the ocular surface until after the toric surfacing had been completed. Otherwise, the significant grinding and polishing required for producing a toric surface on a semifinished lens would essentially destroy the multifocal lens segment.

In order to allow placement of a minor lens segment on the ocular surface of a lens after it has been finished, it would be necessary to provide multifocal minor lens segments having front surface curvatures which would match all possible ocular toric surface curvatures so that the minor lens could be adhesively secured to the rear surface of the major lens. Unfortunately, in order to do this an inordinate number of minor lens segments would be required. For example, for a single type of bifocal element, such as a "flat-top 25 mm" bifocal, seventeen different bifocal segments are required to encompass an ordinary power range from plus one diopter to plus five diopter "add" power, in 0.25 diopter steps. However, this assumes that only a single, known curvature was provided on the rear surface of the main lens, so that the front surfaces of these seventeen segments could be finished to that curvature. In reality, however, 320 different spherical curve possibilities are available if the ocular concave surface is varied between plano and minus 20 diopters in increments of 0.0625 diopters, assuming that each curve is ground very precisely. When variations due to finishing tolerances are taken into account, there may be many more curve possibilities. Furthermore, even if tolerance variations are ignored, if each spherical curve is compounded with a cylindrical curve ranging between zero and five diopters (also in 0.0625 diopter steps) then there are eighty possible cylindrical values for each spherical curve, producing 25,600 different curve combinations. In addition, the axis of each cylindrical curve can assume any rotational position from zero to 180 degrees in one degree steps so that the number of curve combinations now increases to 25,600 times 180, or 4,608,000 different toric curves possible on the rear surface of the main lens. Since there are seventeen "add" powers for each type of bifocal, the number of segments required for just one complete inventory of flat top 28 mm bifocal segments would be 78,336,000 in order to closely match the curvatures of the front surfaces of the minor lens components to the rear curvatures of the major lens components. Such matching would be necessary to provide the close fits necessary to achieve accurate optical powers. Curve mismatches could be filled with the optically clear adhesives, but this is unsatisfactory, for such filling causes serious optical power errors. Of course, such an inventory is impractical, if not impossible, for any single retailer or wholesale laboratory to maintain, and for this reason rear surface multifocal minor lens elements are not provided in today's market.

The provision of near vision segments on the rear surface of an ophthalmic lens is highly desirable, since, as explained above, the variations in lens thickness due to differences in prescription and differences in lens diameter, as well as other variations in the lenses, play virtually no role in determining the "add" power provided by a rear-mounted or minor lens element. Thus, if the required inventory for such a lens could be reduced to, for example, seventeen different elements for a given type of minor lens, i.e., one for each of the add powers desired, the manufacture of such multifocal lenses would be very attractive, since a rear surface multifocal element provides superior optics.

SUMMARY OF THE INVENTION

Briefly, the present invention is directed to a method of producing a multifocal ophthalmic lens assembly having a near vision minor lens secured to the ocular surface of an ophthalmic major lens. More particularly, the invention is directed to an ophthalmic lens assembly wherein a minor lens, sometimes referred to as a bifocal button, is provided on the ocular surface of an ophthalmic major lens which is finished on both the front and rear surface, with the rear surface having a compound toric curvature. The major lens may either be selected from a stock of standard ophthalmic lenses having predetermined toric curvatures, or may be ground and polished to prescription by a retailer or by a wholesale laboratory, before the addition of the minor lens. If desired, the major lens may also be edged to fit the specific frame selected by the patient. The minor lens is completely finished, having a desired, preselected near vision "add" power, with a non-toric front surface curvature, or base curve. The minor lens, or button, is constructed, in accordance with the present invention, from a flexible optical material such as a polyurethane elastomer, or from a conventional optical resin such as the widely available CR-39 lens material. The selected button is positioned with its front surface adjacent that portion of the finished ocular surface where it is to be secured, and the minor lens is then deformed to cause the front surface of the minor lens to assume the shape of the ocular surface of the major lens. This deformation can be produced, for example, by positioning the major lens and the minor lens horizontally so that gravity holds the minor lens in place, and then exerting a gentle, evenly distributed force against the minor lens to cause it to conform to the shape of the major lens surface. The shaped near vision minor lens is secured to the ocular surface of the major lens by a suitable adhesive, by fusing, or by other desired bonding techniques to thereby produce a finished multi-focal lens assembly that does not require additional surfacing.

By using a highly flexible, elastic material which can be deformed without changing its optical power, or in the case of a relatively inflexible material such as CR-39 resin by heating the material of the minor lens only to a flexing temperature so that it does not melt, the minor lens retains the dimensions which control its add power properties, yet still conforms itself to the shape of the ocular surface of the major lens. This allows the minor lens element to accommodate itself to a wide range of toric curves to thereby provide the improved optical characteristics that rear surface near vision lens elements are known to produce, without requiring further finishing of the lens.

The procedure for bonding the minor lens element to the major lens is extremely important since not only must the minor lens be securely attached, but it must be done in such a way as to provide a cosmetically acceptable appearance. The human eye can detect blemishes on the order of less than one micron on the surface of an ophthalmic lens, so great care must be taken in securing the minor lens to the major lens. However, when two lens elements are bonded together by means of an adhesive material to produce the assembly discussed above, excess adhesive is always produced when the lens elements are pressed together. Because the adhesive used to produce such a lens assembly must exhibit unusually high adhesion characteristics and immunity from as many solvents as possible, such excess adhesive is extremely difficult, if not impossible, to remove from the lens surfaces once it has cured. Accordingly, in accordance with the present method, the adhesive is allowed to cure only partially, so that the bond between the major and minor lens elements is secure, but has not reached its maximum bond strength. In this condition, the excess adhesive is removed by a suitable solvent using a cotton swab, for example, and then curing is completed, thereby producing a high quality, blemish-free lens.

In accordance with the present invention, then, a full range of multi-focal lens assemblies can be provided through the use of about seventeen different minor lens elements for each style of bifocal lens. The near vision minor lens elements are easily secured to the ocular surface of any finished ophthalmic lens, even those having the most complex toric curvatures, and this can be done simply and quickly, without the need for complex assembly procedures and without the need for grinding and polishing the front surface of the major lens, thereby allowing even the smallest retail dispensary to produce multifocal lenses quickly and inexpensively. Furthermore, the technique of the present invention permits accurate placement of near vision elements for an individual patient, since the near vision segment can be located and secured in place after the major lens has been surfaced and mounted in the proper frames.

The present technique for providing multifocal lenses is particularly useful in the application of a minor lens element to the ocular surface of a major lens element having a complex toric curvature. However, the technique is also useful for applying minor lens elements to the front surfaces of major lenses, if that should be desired, for the technique provides an accurate mating of the curvature of the minor lens to that of the major lens for close, accurate bonding of the elements. The flexible minor lens element will match all the major lens base curves, even if the base curves are far from their nominal values. Although the problem of providing the correct add power still arises, due to the need to finish the major lens to prescription, the problem is greatly diminished because it is possible to place the minor lens element on the major lens after the ocular surface has been ground and polished. This permits the lens assembler to check the actual add power provided by a selected element before the minor lens element is secured to the major lens. The minor lens elements can be selected for their add power, without concern for matching curves, and without the need to worry about prefinished lenses being out of tolerance.

Although the present invention is described in terms of bifocal elements, it will be apparent that trifocal and other multi-focal lenses may be made following the same techniques. Furthermore, the lens assembly of the present invention is particularly useful in combination with photochromic major lenses, since the near vision minor lens elements are placed on the back surface of the major lens, and thus the minor lens does not interfere with the photochromic changes in the major lens.

BRIEF DESCRIPTION OF THE DRAWINGS

The foregoing and additional objects, features and advantages of the present invention will become apparent to those of skill in the art from the following detailed description of a preferred embodiment thereof, taken in conjunction with the accompanying drawings, in which:

FIG. 1 is a perspective rear view of an ophthalmic lens assembly in accordance with the present invention, having a minor lens secured to the finished ocular surface of a major lens;

FIG. 2 is a cross-sectional view of the lens assembly of the invention, taken along line 2—2 of FIG. 1;

FIG. 3 is a cross-sectional view of a typical prior art multivision lens assembly;

FIG. 4 is a cross-sectional view of a second type of prior art multivision lens assembly;

FIGS. 5A-5C illustrate typical near vision minor lens elements;

FIGS. 6-8 illustrate the method of assembling a multivision lens in accordance with one aspect of the present invention; and FIG. 9 illustrates an alternative embodiment of the method of FIGS. 6-8.

Description of Preferred Emnbodiment

Turning now to a more detailed consideration of the present invention, there is illustrated in FIG. 1 a rear perspective view of an ophthalmic lens assembly 8 including a major lens element 10 having an ocular, or rear surface 12 which is generally concave, and a front surface 14 which is flat or slightly convex. When the lens has a negative power, the edge 16 of the lens will have a thickness greater than the thickness of the lens at its optical axis 18; with a positive power the edge 16 will be thinner than at the axis 18 of the lens.

Lens element 10 is illustrated as being a completely finished lens, having its front surface 14 ground and polished to the desired shape, or in the case of a plastic lens, molded to a desired surface configuration, and having its rear surface 12 finished to meet a specific prescription. The prescription may include, for example, a requirement for a specified far vision power, which is provided by a spherical curvature of selected radius Γ centered on the optical axis 18 for the ocular surface 12. The prescription may also call for a cylindrical curve of selected radius R superimposed on the spherical curve to correct for astigmatism. Such a cylindrical curve will have an axis 20 parallel to the plane of the lens with the axis being rotated in that plane by an angle θ from a reference axis 21 of the lens assembly. This reference axis is the horizontal axis of the lens. In addition, the rear surface 12 of the lens 10 may incorporate a degree of prism for optical center decentration or to correct for other vision abnormalities, in known manner. Thus, the rear surface 12 may form a highly complex toric curve having a wide range of spherical and cylindrical radii with the cylindrical components being oriented at various angles from 0° to 180°, all according to the needs of a specific patient's eyes.

Because of the complexity of the rear surface curvature and the difficulty of mating that curvature to a minor lens element, it has been conventional in the art to place near vision segments, often referred to as minor lens elements, on the front surface of the major lens, as illustrated in FIG. 3 by the near vision segment 22 molded as part of the major lens 10 to form the lens assembly 24, adhesively secured to the front surface 14, or as illustrated in FIG. 4, fused into the front surface of the major lens. FIG. 4 illustrates a conventional glass lens assembly 30 having a major lens element 32 with a rear surface 33 and a front surface 34. The lens is shown as having a positive power, and thus is thinner at its peripheral edge 36 than at its optical axis 38. As is conventional with glass lenses, a near vision segment 42 composed of high index glass, and having a desired add power is fused into the front surface 34 of the major lens 32. Usually the major lens is furnished to a wholesale laboratory in the form of a thick semi-finished lens blank, and the rear surface 33 is then ground and polished to meet the final customized prescription.

In the lenses of FIG. 3 and FIG. 4, the rear surfaces 12 and 33 are finished in accordance with the required prescription, without disturbing the near vision segment. However, as illustrated in these figures, the thickness of the major lens 10 or 32 may vary widely depending upon the prescription, thus altering the desired near vision power of the minor lens segments 22 or 42. This power inaccuracy is highly undesirable, since it frequently produces a large discrepancy in the add power of the near vision lens from the prescribed nominal value. However, it is accepted in the ophthalmic lens industry, inasmuch as the front surface location of the minor lens facilitates the finishing process for the rear surface of the lens, simplifies the machinery required for manufacturing the lens, and thus keeps the cost lower than it might otherwise be if the lens had to be finished to prescription on its front surface.

As illustrated in FIGS. 1 and 2 it is more desirable to place a near vision minor lens element, such as that illustrated at 44, on the finished rear surface 12 of a major lens 10, for by doing so, the optical performance of the lens assembly is enhanced. With such an arrangement the major lens 10 is finished to provide the desired distance prescription, and then the near vision minor lens 44 is added to it to produce the desired near vision prescription.

As will be apparent from a consideration of FIGS. 1 and 2, if the rear surface 12 of major lens 10 is to be ground to a complex curvature, the near vision segment cannot be placed on that surface until the surfacing is complete. Otherwise, the rear-mounted near vision segment would be ground and polished with the rest of the rear surface, and it would be destroyed. However, the complexity and number of possible rear surface curvatures is almost unlimited, as pointed out above, and for this reason it has not been considered practical to attempt to provide near vision segments having front surfaces adapted to all of the available compound curves.

In accordance with the present invention, near vision lens elements are made available for all possible curvatures for the rear surfaces of ophthalmic lenses by forming a near vision minor lens element 44 from an optical material such as conventional optical grade ophthalmic lens materials. Preferably a flexible, elastic, highly scratch resistant urethane or other elastomeric material is used, although an optical resin, the most common of which is CR-39 polymer manufactured by PPG Industries, may also be used. Three such near vision minor lens elements are illustrated in perspective at 44, 44' and 44'', in FIGS. 5A–5C as examples of the variety of optical powers and styles which may be provided. The particular style of the lens element selected will depend upon the prescription required by a particular patient, but the lens generally will be wedge-shaped in cross section as illustrated in FIG. 3 with one version having a flat upper surface 46, and a semi-circular lower edge 48, as shown in FIG. 5A for a conventional flat-top bifocal element. The minor lens preferably will have a thickness and curvature sufficient to provide between a plus 1 and a plus 5 diopters of additional power to the major lens 10. Lens 44' shown in FIG. 5B illustrates an "invisible" bifocal, which tapers to an extremely thin edge 48' in all directions from a central add power zone 49. Lens element 44'' shown in FIG. 5C has a flat top 46'', a lower edge 48'', and has two separate power segments 50 and 51, thus providing a trifocal when secured to a major lens.

The front surfaces 52, 52' or 52'' of the near vision minor lenses preferably have a +8 diopter base spherical curvature to place the curvature of the front surface of the minor lens slightly higher than the middle of the usual range of spherical curvatures for the ocular surface 12 of a main lens. The relative front and back curvatures and the index of refraction of the minor lens essentially determines its power, with seventeen lenses of differing powers being required to provide a set covering each add power from +1 diopter to +5 diopter in 0.25 diopter steps. One such set would be provided for each type of multifocal minor lens; i.e., one for each of the types shown in FIGS. 5A, 5B and 5C.

The near vision minor lens 44 may be secured to the rear surface 12 of major lens 10 in the manner illustrated in FIGS. 6–8. The major lens 10 is placed in a horizontal position (FIG. 6) with its optical axis 18 substantially vertical, and its finished concave ocular surface 12 facing upwardly. A small portion of a flowable adhesive material is placed on the surface 12 at about the center of the selected location for the near vision lens element which is to be secured to the major lens. A near vision minor lens 44, having the desired add power and the correct size and shape for the selected lens 10, is aligned with the finished major lens 10 and is carefully positioned on the adhesive 54 and is pressed gently toward surface 12, as illustrated in FIG. 7, to spread the adhesive 54 in a thin layer between the two lens elements. Since in most cases the surface 12 will be an extremely complex curve, the base curve of the front surface 52 of the minor lens 44 will not match surface 12, but will contact it at one or more points, usually at the center of the spherically curved surface 52, with the major part of the facing surfaces being spaced apart, as may be seen in FIG. 7. The minor lens 44 is then deformed by a gentle pressure, or by a continuous pressure with mild heat on some materials, to force it down to produce full contact between the surface 52 of the minor lens 44 and the ocular surface 12 of the major lens 10.

Preferably the minor lens is formed of an elastomeric material which is flexible at room temperature, so that the minor lens can be pressed against the surface of the major lens, and will conform to the shape of its ocular surface, without the need to apply heat. Such a flexible material can be pressed into complete contact with the major lens using a gentle uniform pressure, which is just sufficient to cause the adhesive to spread completely and evenly between the two adjacent surfaces, and to conform the minor lens to the toric surface of the major lens. Flexibility of the minor lens at room temperature is not essential, as long as the material can be brought into a flexible state, as by heating, without distorting its optical power.

If the major lens is formed from CR-39 plastic, it will withstand continuous heat of up to 250° F. without damage, and the minor should be formed from a material that will become flexible at a temperature lower than 250° F. It has been found that the very thin minor lens element 44 can itself be made of CR-39 plastic, which is somewhat brittle at room temperature, but will soften and become very flexible, without melting, at a temperature of about 150°–225° F. When a sufficient amount of heat has been applied to cause a CR-39 minor lens 44 to reach the temperature at which it is flexible, but lower than the temperature at which it melts, the lens 44 will deform to bring the front surface 52 into complete, continuous, intimate contact with the surface 12 of the major lens 10, conforming the shape of lens 44 to the compound toric shape of ocular surface 12, as illustrated in FIG. 8, without adversely affecting the add power of the minor lens.

In the preferred form of the invention, front surface 52 of the near vision minor lens segment 44 and the adjacent ocular surface of lens 10 become coated with a very thin layer of adhesive 54, which preferably is an optically clear silicon adhesive, as lens 44 deforms into contact with surface 12. Any excess adhesive will be squeezed out from between the lenses, as illustrated at 56 in FIG. 7. If the lens material is sufficiently flexible, the minor lens may be pressed gently against the surface 12 of the lens 10 by an air pressurized balloon or a very soft elastomeric spheroid since gravity and or surface tension is often insufficient to provide the desired intimate contact. The near vision lens is complete after the adhesive cures, and no additional surfacing is required.

The excess adhesive 56, although optically clear, must be removed in order to provide a market-acceptable multifocal lens, for a bead of excess adhesive around the periphery of the lens would be very visible to the lens wearer. The excess material must be removed before the adhesive cures, however, for thereafter it becomes almost impossible to remove from the lens assembly without damaging one or the other of the lens elements. This removal can be accomplished by swabbing the lens with a suitable solvent after the adhesive has partially cured. The solvent is applied after the cure is sufficient to hold the lens 44 in place, but before it has cured enough to be resistant to the solvent.

Although the foregoing description has been directed to plastic major lenses receiving plastic near vision minor lens elements, a similar procedure is available for glass major lenses using glass near vision minor lens elements. In that case, the major glass lens is finished to provide the required compound curvature on its ocular surface, the near vision minor lens is positioned in the same manner as illustrated in FIGS. 6 and 7, and the minor lens is heated. Because the minor lens element is thinner and smaller than the major lens, it will reach a flexing or bending temperature before the major lens becomes deformed by the heat, so the minor lens will sag downwardly into intimate and complete contact with the surface 12, taking on the shape of the compound curve of the finished lens. The glass major and minor lenses will then fuse readily to each other, with no additional adhesive being required. As a further option, polymeric near vision minor lens elements can be placed on glass major lenses, in the preferred embodiment, and secured in place by a suitable adhesive after deformation in the manner described above.

FIG. 9 illustrates a modified form of the method described with respect to FIGS. 6, 7 and 8, wherein the minor lens element 44 is held in place against the major lens element by means of a nonadherent air balloon. Thus, the minor lens element 44 is positioned with adhesive 54 on the ocular surface 12 of major lens element 10 and these two elements are held in the desired relationship by means of air pressure in a balloon 60. The balloon is made of a material that will not adhere to the adhesive 54, and is filled with air under mild pressure from a pipe 62. If heating of element 44 is required, the air may be heated to a sufficient temperature to soften the minor lens element 44, as discussed with respect to FIG. 7. The air in the balloon applies an even pressure to the delicate minor lens element 44 as it is forced into the toric curvature of the ocular surface 12 to which it will be bonded. A suitable nonadherent material for the balloon may be a simple cross-linked polydimethylsiloxane elastomer, for such materials exhibit very poor adhesion to most adhesives, are very clear, have good elongation (over 1,000%) and can be heated if desired to several hundred degrees F. If the balloon is not filled to a very high pressure, it can be used to apply a uniform, gentle pressure to the lens element 44 to hold it in position as the lens element is heated, reshaped, and cooled, and while the adhesive cures.

Several optically clear materials are suitable for use in forming the thin minor lens elements of the present invention. For example, the element 44 can be formed from a cured CR-39 allyl diglycol polycarbonate, which is the same material used to make the most popular "plastic" resin ophthalmic lens. Although this material is hard, essentially inflexible, and durable when cured, it is extremely flexible and resilient at a temperature between 150° and 250° F. so that with proper handling, a thin minor lens element can be shaped to conform to a broad range of toric curvatures and then affixed adhesively to the rear surface of a major lens element.

Urethanes such as polytetramethylene glycol ether based urethanes which are very hard and highly scratch-resistant elastomers, can be used for making the thin flexible minor lens elements of the present invention. This material is not only very light weight, but also exhibits a high index of refraction, allowing the lenses to be thinner than usual; furthermore, this material exhibits a very high impact resistance. A suitable material of this type is the Pellethane 2103-90A elastomer manufactured by Dow Chemical Corporation. In addition, other elastomers such as silicones, polyurethanes, polyethers, polyesters, styrenics, polyacrylates, and other such materials may also be used. Preferably, the minor lenses are formed by casting or by injection molding the material into the desired near vision segment shapes, although mass grinding and polishing is also possible.

Although the foregoing invention has been described in terms of preferred embodiments thereof, it will be apparent to those of skill in the art that numerous variations and modifications may be made without departing from the true spirit and scope thereof, as set forth in the accompanying claims. Thus, for example, the flexible multifocal minor lens element described herein could also be applied to the front surface of a single vision major lens element to produce a more conventional multifocal product. In such a case, the minor lens element would be deformed by mild pressure and/or heat to match the curvature of the front surface of the major lens, and then adhesively secured thereto. The number of minor lens elements required for an inventory for front surface lamination would still be only seventeen for any given type of minor lens, for each multifocal minor lens element can be flexed to fit any front base curve spherical surface. Of course, such a front surface mounting does not eliminate the undesired optical errors that result from such a location of the near vision lens element. In addition there is the added hazard of exposing the minor lens element to unnecessary scratching, for when placed on the front surface of the lens, it is usually at the crest of the highest lens point, where it is most likely to be damaged. On the other hand, when the minor lens is placed on the ocular surface it is protected to some extent by its location in a generally concave surrounding, which is another advantage of such a location.

Although the minor lens has been shown as being relatively simple, it should be understood that this lens can be produced to incorporate additional curve corrections, such as through the provision of an aspherical surface. Furthermore, the minor lens may take any conventional shape, such as "round" bifocals, and full-width "executive" style bifocals or trifocals, in addition to the "flat-top" bifocal or the "invisible" multifocals shown in the drawings without departing from the true spirit and scope of the present invention, as defined in the following claims.

What is claimed is:

1. A method of producing a multifocal lens assembly having a near vision minor lens element secured to the surface of a major lens element, comprising
   providing a major lens element having a front surface and an ocular surface, at least one of said surfaces being finished;
   providing a set of completely finished minor lens elements, each minor lens in said set having a different one of a plurality of preselected add powers, each of said minor lens elements having first and second continuously curved surfaces, the relative curvatures of said first and second surfaces establishing a fixed power for that lens element, said lens element being optically clear, elastic, and highly flexible to permit mechanical deformation of said lens element without affecting the power thereof, said minor lens being sufficiently flexible to provide one surface there of with a minor lens base curve matched to the curvature of the finished surface of a major lens element substantially without loss of the selected add power for the major lens element;
   selecting one of said completely finished minor lens elements from said set in accordance with the add power required for said major lens element;
   positioning said selected minor lens element with its said one surface adjacent a selected portion of a finished surface of said major lens element;
   deforming said one completely finished minor lens element, while retaining its add power, to cause said one surface of said minor lens element to flex sufficiently to conform to the shape of the adjacent finished surface of the major lens; and
   adhesively securing the deformed minor lens to the finished surface of the major lens thereby producing a finished multifocal lens assembly.

2. The method of claim 1, wherein the step of securing includes adhesively securing said one surface of the deformed minor lens to the adjacent surface of the major lens.

3. The method of claim 2, wherein the step of adhesively securing includes placing a small quantity of adhesive on said selected portion of a surface of said major lens element prior to deforming said minor lens element against said surface of said major lens element, and spreading said adhesive into a thin layer by pressing said minor lens element against said major lens element.

4. The method of claim 3, further including partially curing said adhesive while pressing said minor lens element in place against said surface of said major lens element.

5. The method of claim 4, further including clearing any excess adhesive from said major and said minor lens elements, and thereafter completely curing said adhesive.

6. The method of claim 1, wherein the step of securing includes fusing a front surface of said minor lens element to an ocular surface of said major lens element.

7. The method of claim 1, wherein each element in said set has a different add power, and
   selecting from said set the lens element having the add power required to meet a lens prescription to be filled.

8. A method of producing a multifocal lens assembly having a near vision minor lens element secured to a surface of a major lens element, comprising:
   providing a finished major lens element having a front surface with a base curve and having an ocular surface having a complex toric prescription curve;
   providing a set of completely finished minor lens elements, each minor lens element having a front surface base curve;
   placing an adhesive material on a selected portion of said ocular surface of said major lens element;
   positioning one minor lens element selected from said set with its front surface adjacent said selected portion of said ocular surface of said major lens and in contact with said adhesive material;
   deforming said one minor lens element into conformation with the toric curvature of said selected portion of said ocular surface while compressing and spreading said adhesive material uniformly between the adjacent surfaces of said major and said minor lens elements; and
   curing said adhesive to secure said minor lens element to said major lens element.

9. The method of claim 8, wherein the step of deforming includes pressing a flexible minor lens element against said major lens element.

10. The method of claim 8, wherein said set of minor lens elements includes a plurality of elements, each having a different near vision power; and
wherein the step of positioning a minor lens element selected from said set includes selecting the element having the near vision power required to meet the patient's near vision ophthalmic prescription when secured to said major lens element.

11. The method of claim 8, wherein the step of providing a set of minor lens elements includes providing one minor lens for each of a plurality of near vision powers, wherein each minor lens element has the same base curve.

12. The method of claim 8, wherein the step of deforming includes heating said one minor lens element to a flexing temperature, and thereafter pressing said one minor lens element against said major lens element.

13. A method of producing a multifocal ophthalmic lens assembly, comprising:
providing a major lens element having a front surface and an ocular surface, at least one of said surfaces being finished;
providing a completely finished minor lens element having a preselected add power, said lens element having finished first and second continuously curved surfaces with the relative curvatures of the surfaces establishing a fixed near vision add power for said minor lens element, said lens element being optically clear, elastic, and highly flexible to permit mechanical deformation of said lens element without affecting the power thereof, one of said continuously curved surfaces providing a base curve for said minor lens element which is sufficiently flexible to exactly match the curvature of a surface of said major lens element substantially without change in the fixed power for said minor lens element;
positioning said completely finished minor lens element on a selected portion of a finished surface of said major lens, with said base curve surface of said minor lens element adjacent said selected portion of said finished surface of said major lens;
deforming said completely finished minor lens element to cause said base curve surface of said minor lens element to engage and to conform exactly to the shape of said finished surface of said major lens while retaining the fixed near vision add power of said minor lens; and
adhesively securing the deformed completely finished minor lens element to said adjacent finished surface of said major lens, thereby to produce a finished multifocal lens assembly.

14. The method of claim 13, wherein the step of positioning said minor lens element comprises positioning said base curve surface of said minor lens element on the ocular surface of said major lens, said ocular surface having a finished complex toric prescription curve and said minor lens conforming to said toric curve while retaining said fixed near vision add power.

15. The method of claim 14, wherein the step of deforming said minor lens includes pressing said minor lens with a uniform light pressure against said major lens element.

16. The method of claim 14, wherein the step of deforming said minor lens includes applying a uniform pressure to the surface of said minor lens opposite to its base curve surface to force said base curve surface into full contact with said adjacent finished surface of said major lens.

17. The method of claim 16, wherein the step of adhesively securing includes applying an adhesive material between said base curve surface of said minor lens element and said adjacent finished surface of said major lens element before the deformation of said minor lens element, whereby the deformation of said minor lens element spreads said adhesive material in a thin layer between said major lens element and said minor lens element.

18. The method of claim 17, further including curing said thin layer of adhesive material to secure said deformed minor lens in intimate contact with said adjacent finished surface of said major lens element.

* * * * *